United States Patent
Nguyen et al.

(10) Patent No.: US 11,687,575 B1
(45) Date of Patent: Jun. 27, 2023

(54) EFFICIENT SEARCH FOR COMBINATIONS OF MATCHING ENTITIES GIVEN CONSTRAINTS

(71) Applicant: SAP SE, Walldorf (DE)

(72) Inventors: Hoang-Vu Nguyen, Leimen (DE); Rajesh Vellore Arumugam, Singapore (SG); Matthias Frank, Heidelberg (DE); Stefan Klaus Baur, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/647,477

(22) Filed: Jan. 10, 2022

(51) Int. Cl.
*G06F 16/33* (2019.01)
*G06F 16/35* (2019.01)
*G06F 16/31* (2019.01)

(52) U.S. Cl.
CPC ........ *G06F 16/3347* (2019.01); *G06F 16/325* (2019.01); *G06F 16/3346* (2019.01); *G06F 16/35* (2019.01)

(58) Field of Classification Search
CPC .... G06F 16/3347; G06F 16/35; G06F 16/325; G06F 16/3346
See application file for complete search history.

(56) References Cited

U.S. PATENT DOCUMENTS

| | | | |
|---|---|---|---|
| 10,783,377 B2 * | 9/2020 | Katti | G06V 10/82 |
| 2020/0193511 A1 * | 6/2020 | Saito | G06N 3/08 |
| 2021/0150201 A1 * | 5/2021 | Reisswig | G06N 3/045 |

OTHER PUBLICATIONS

U.S. Appl. No. 17/452,441, filed Oct. 27, 2021, Arumugam et al.
Bringmann, "A near-linear pseudopolynomial time algorithm for subset sum" Proceedings of the Twenty-Eighth Annual ACM-SIAM Symposium on Discrete Algorithms. Society for Industrial and Applied Mathematics, 2017, 12 pages.
Cao et al., "New Algorithms for Subset Sum Problem" arXiv preprint arXiv:1807.02611v2, Jul. 2018, 10 pages.
Kleinberg and Tardos, "Algorithm Design" (2nd ed.), Pearson Education Inc., 2006, 432 pages.
Pisinger, "Linear time algorithms for knapsack problems with bounded weights" Journal of Algorithms 33.1, Oct. 1999, 14 pages.

* cited by examiner

*Primary Examiner* — Baoquoc N To
(74) *Attorney, Agent, or Firm* — Fish & Richardson P.C.

(57) ABSTRACT

Methods, systems, and computer-readable storage media for receiving a set of inference results generated by a ML model, the inference results including a set of query entities and a set of target entities, each query entity having one or more target entities matched thereto by the ML model, processing the set of inference results to generate a set of matched sub-sets of target entities by executing a search over target entities in the set of target entities based on constraints, for each problem in a set of problems, providing the problem as a tuple including an index value representative of a target entity in the set of target entities and a value associated with the query entity, the value including a constraint relative to the query entity, and executing at least one task in response to one or more matched sub-sets in the set of matched sub-sets.

20 Claims, 6 Drawing Sheets

US 11,687,575 B1

EFFICIENT SEARCH FOR COMBINATIONS OF MATCHING ENTITIES GIVEN CONSTRAINTS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching an entity, referred to as a query entity, to one or more other entities, referred to as target entities. Examples include, without limitation, matching questions to answers, people to products, bank statement records to invoice records, and bank statement records to customer accounts.

In some instances, matching each query entity in a query document to one or more target entities in a target document can be executed under a constraint. An example constraint can include a value sum of the target(s) predicted to match to a query. This example constraint is referred to as a value sum constraint herein. For example, a value associated with a query entity should have some relation to a sum of values associated with one or more target entities that are predicted to be a match for the query entity. This can be referred to as a value sum problem, in which multiple different sub-sets of target entities are to be identified, which meet the value sum constraint.

To search for sub-sets of target entities that meet the value sum constraint in a set of target entities, a traditional approach includes exhaustively enumerating all of the sub-sets of target entities in the set of target entities and determining whether each sub-set meets the value sum constraint. However, the number of possible sub-sets is exponential to the size of the set of target entities. That is, for example, the number of possible sub-sets in the set of target entities is equal to $2^N$, where N is the number of target entities in the set of target entities. Such an approach, however, is only practical when the number of target entities in the set of target entities is small (e.g., ≤20). When the number of target entities in the set of target entities is large, enumerating all of the sub-sets of target entities becomes so computationally intensive that it is not practical given hardware constraints. That is, for example, such an approach is overly burdensome on processing power (CPU cycles) and memory. For example, when the number of target entities in the set of target entities is 20, there are already 1,048,576 possible sub-sets to be enumerated. In typical instances the number of target entities in the set of target entities is over 1000. As an example, if the number of target entities in the set of target entities is 1000, there are $1.07e^{301}$ sub-sets to enumerate.

SUMMARY

Implementations of the present disclosure are directed to a resource-efficient search for matching query entities to one or more target entities under a constraint. More particularly, implementations of the present disclosure are directed to a resource-efficient search that identifies sub-sets of matching entities from a set of matching entities under a constraint using decomposed searching and memory.

In some implementations, actions include receiving a set of inference results generated by a machine learning (ML) model, the inference results including a set of query entities and a set of target entities, each query entity having one or more target entities matched thereto by the ML model, processing the set of inference results to generate a set of matched sub-sets of target entities by executing a search over target entities in the set of target entities based on constraints, for each problem in a set of problems, providing the problem as a tuple including an index value representative of a target entity in the set of target entities and a value associated with the query entity, the value including a constraint relative to the query entity, and executing one of: determining, at least partially based on the index value, that a solution to the problem is stored in memory, and in response, processing a next problem, determining that the value is outside of a limit range associated with the index value, and in response, determining that the problem has no matched sub-sets, determining that the target entity represented by the index value is a last target entity to be considered and, in response, executing one of including a value of the target entity into a singleton matched sub-set in response to determining that the value of the target entity corresponds to the value associated with the query entity, and determining that the problem has no matched sub-sets, and determining that the target entity represented by the index value is a last target entity to be considered and, in response, dividing the problem into sub-problems and selectively storing solutions to the sub-problems in the memory, and executing at least one task in response to one or more matched sub-sets in the set of matched sub-sets. Other implementations of this aspect include corresponding systems, apparatus, and computer programs, configured to perform the actions of the methods, encoded on computer storage devices.

These and other implementations can each optionally include one or more of the following features: actions further include filtering at least one matched sub-set from the set of matched sub-sets to provide filtered inference results in response to a confidence value of the at least one matched sub-set being less than a threshold confidence value, the one or more matched sub-sets being included in the filtered inference results; the confidence value of the at least one matched sub-set is provided as an average of confidence values of one or more target entities included in the at least one matched sub-set; the memory includes a hash table; one or more solutions are at least partially based on a tolerance value; each problem is provided in a stack and search over target entities terminates in response to determining that the stack is empty; and actions further comprise selectively filtering at least one target entity from the set of target entities before generating the inference results by the ML model in response to the at least one target entity being associated with a zero value in the target value field.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
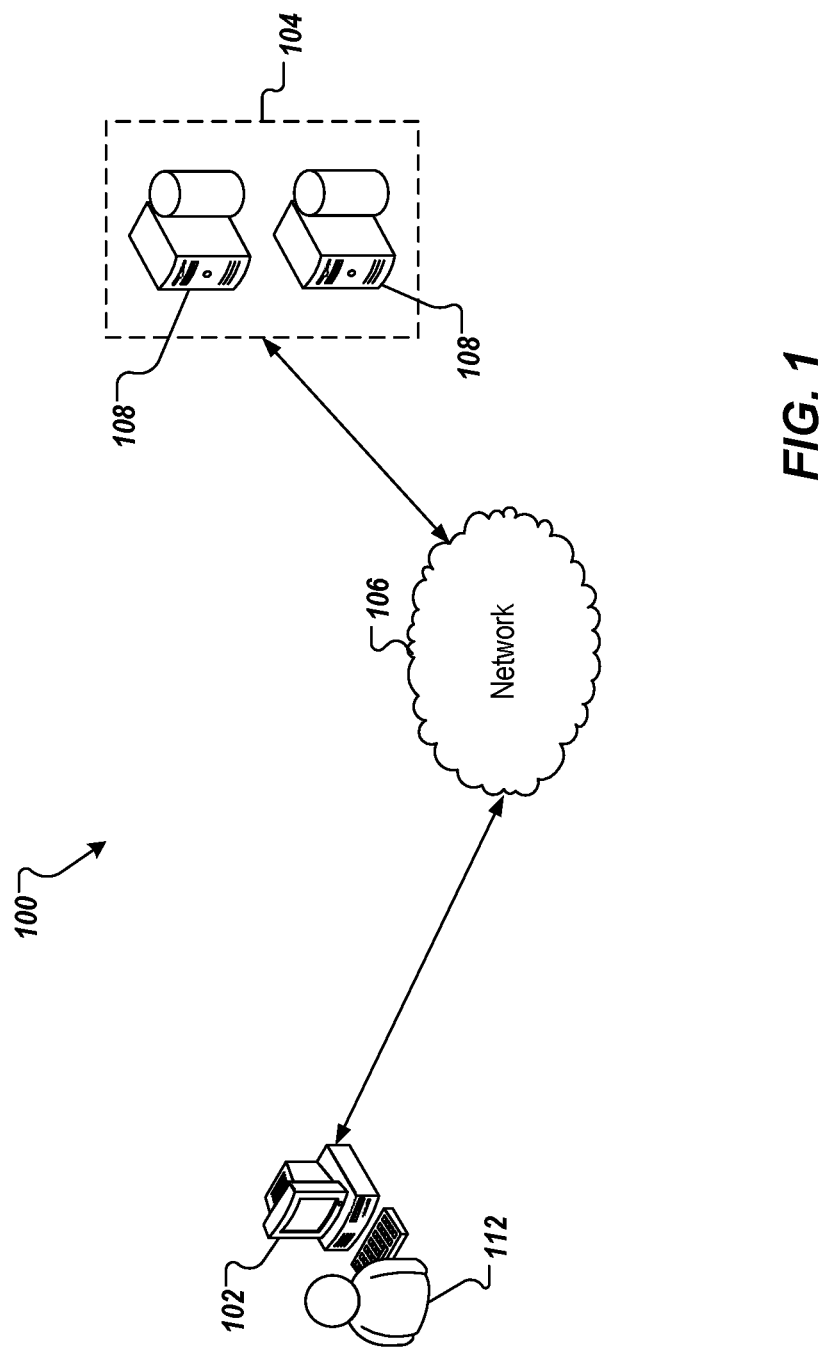
FIG. 1 depicts an example architecture that can be used to execute implementations of the present disclosure.

Implementations of the present disclosure are directed to a resource-efficient search for matching query entities to one or more target entities under a constraint. More particularly, implementations of the present disclosure are directed to a resource-efficient search that identifies sub-sets of matching entities from a set of matching entities under a constraint using decomposed searching and memory.

Implementations can include actions of receiving a set of inference results generated by a machine learning (ML) model, the inference results including a set of query entities and a set of target entities, each query entity having one or more target entities matched thereto by the ML model, processing the set of inference results to generate a set of matched sub-sets of target entities by executing a search over target entities in the set of target entities based on constraints, for each problem in a set of problems, providing the problem as a tuple including an index value representative of a target entity in the set of target entities and a value associated with the query entity, the value including a constraint relative to the query entity, and executing one of: determining, at least partially based on the index value, that a solution to the problem is stored in memory, and in response, processing a next problem, determining that the value is outside of a limit range associated with the index value, and in response, determining that the problem has no matched sub-sets, determining that the target entity represented by the index value is a last target entity to be considered and, in response, executing one of including a value of the target entity into a singleton matched sub-set in response to determining that the value of the target entity corresponds to the value associated with the query entity, and determining that the problem has no matched sub-sets, and determining that the target entity represented by the index value is a last target entity to be considered and, in response, dividing the problem into sub-problems and selectively storing solutions to the sub-problems in the memory, and executing at least one task in response to one or more matched sub-sets in the set of matched sub-sets.

Implementations of the present disclosure are described in further detail with reference to an example problem space that includes the domain of finance and matching bank statements to invoices. More particularly, implementations of the present disclosure are described with reference to the example use case of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate problem space.

Implementations of the present disclosure are also described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP Leonardo Machine Learning) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statement, invoice table), and can match entities within the electronic document (e.g., a bank statement) to one or more entities in another electronic document (e.g., invoice table). In some examples, the server system 104 includes a ML platform that provides and trains a ML model, as described herein.

Figure 2:
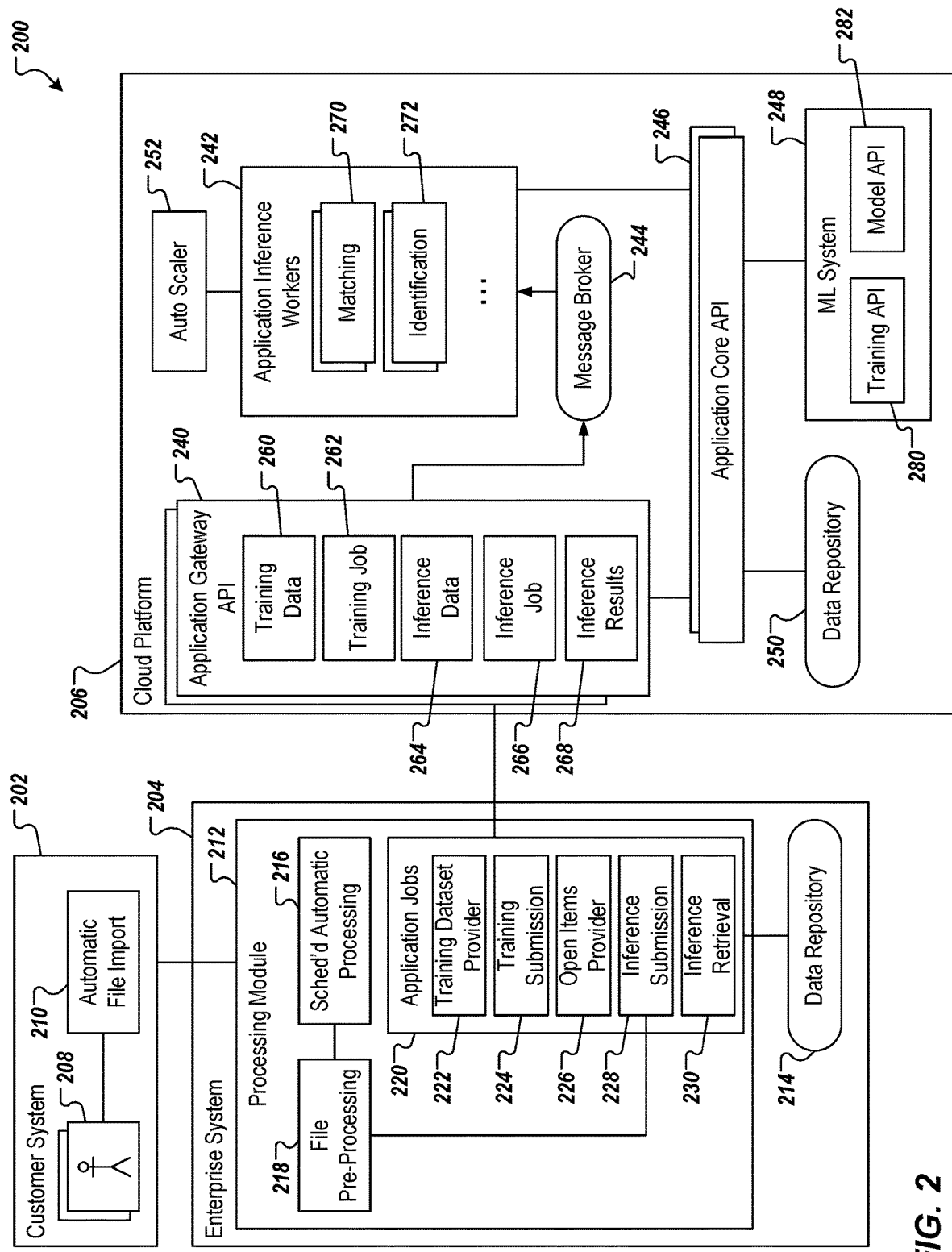
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance—accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP Leonardo Machine Learning. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

To provide further context for implementations of the present disclosure, and as introduced above, the problem of matching entities represented by computer-readable records (electronic documents) appears in many contexts. Example contexts can include matching product catalogs, deduplicating a materials database, and matching incoming payments from a bank statement table to open invoices, the example use case introduced above.

Figure 3:
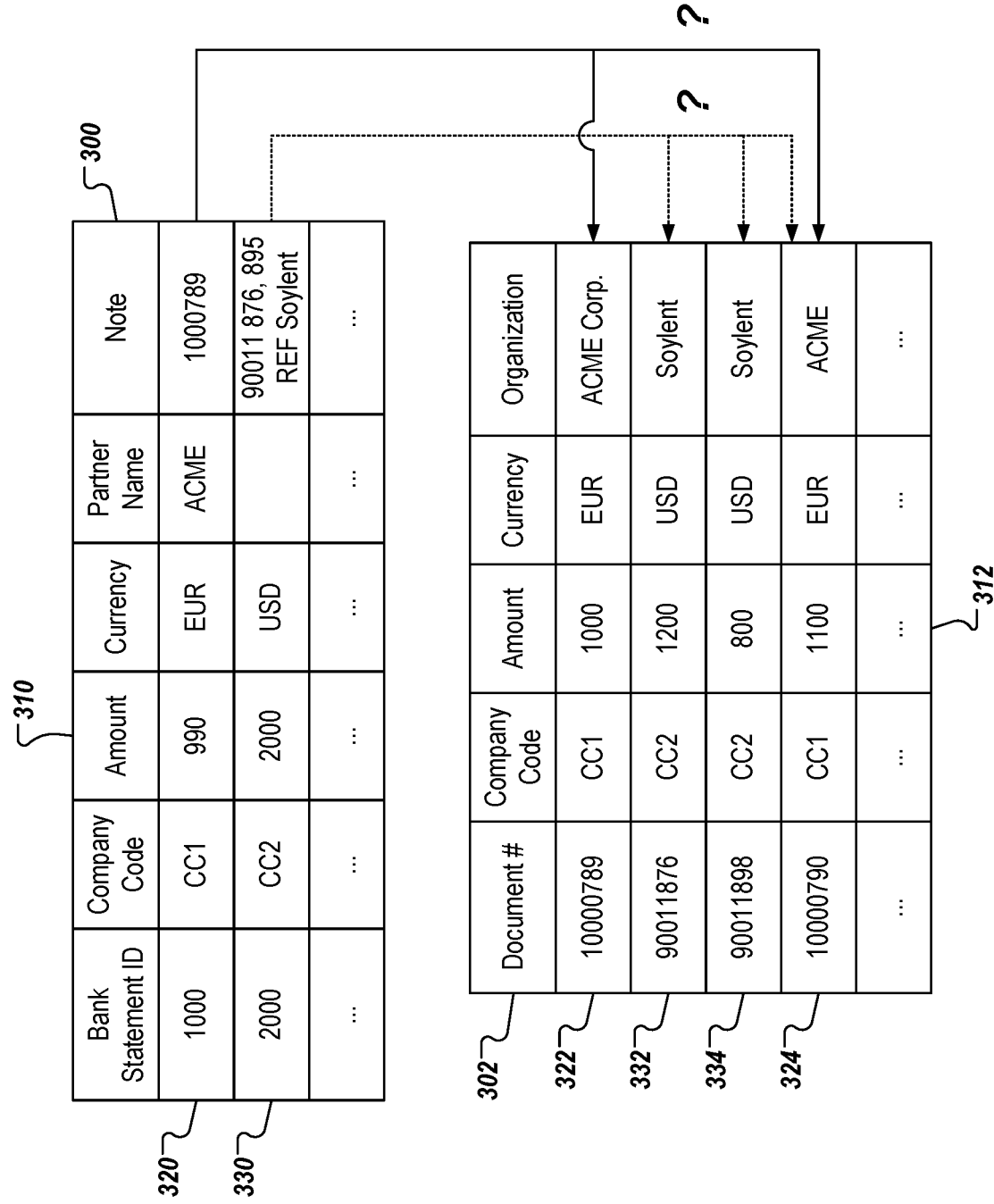
FIG. 3 depicts portions of example electronic documents.

In the example use case, FIG. 3 depicts portions of example electronic documents. In the example of FIG. 3, a first electronic document 300 and a second electronic document 302 are depicted. The first electronic document 300 can be referred to as a query document and includes query entities. The second electronic document 302 can be referred to as a target document and includes target entities. In the context of the present disclosure, the first electronic document 300 and the second electronic document 302 can be processed through a ML model in an effort to match each query entity to one or more target entities.

As depicted in FIG. 3, and in accordance with the example use case, the first electronic document includes a bank statement table that includes records (query entities) representing payments received, and the second electronic document 302 includes an invoice table that includes invoice records (target entities) respectively representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (query entity) and one or more invoice records (target entity/-ies) (e.g., using CashApp, as described above).

In the context of implementations of the present disclosure, matching each query entity in a query document to one or more target entities in a target document can be executed under a constraint. An example constraint can include a value sum of the target(s) predicted to match to a query. This example constraint is referred to as a value sum constraint herein. For example, a value associated with a query entity should have some relation to a value sum of values associated with one or more target entities that are predicted to be a match for the query entity. This can be referred to as a value sum problem.

For purposes of non-limiting illustration, the example of FIG. 3 can be considered. In the example of FIG. 3, a value in a field 310 of each query entity should correspond to a sum of values in a field 312 of one or more target entities determined to match a query entity (i.e., the value sum constraint). In some examples, whether a value corresponds to a value sum can be determined as one of the values being equal to the value sum, or the value being within a tolerance (denoted as $\epsilon$, and described in further detail herein) of the value sum. In the example of FIG. 3, the ML model can determine that a bank statement record 320 is a potential match (e.g., single match) to each of an invoice record 322 and an invoice record 324. Selecting which of the invoice record 322 and the invoice record 324 actually is the match to the bank statement record 320 can be based on a value sum constraint. As another example, the ML model can determine that a bank statement record 330 is a potential match (e.g., multi-match) to each of the invoice record 324, an invoice record 332, and an invoice record 334 (e.g., the match to the invoice record 334 can be associated with a relatively low confidence, but is still a proposed match). Selecting which sub-set of the invoice record 324, the invoice record 332, and the invoice record 334 actually is the match to the bank statement record 330 can be based on a value sum constraint.

Formally, the value sum problem can be formulated as a search problem for identifying sub-sets of potential matching target entities having a value sum that corresponds to a value of the query entity. More formally, for each query entity $\vec{q}$ from a query table, let $T=\{\vec{t}_0, \ldots, \vec{t}_{N-1}\}$ be a set of target entities from a target table that constitute matching candidates to $\vec{q}$ (e.g., invoice records having the same company code as a bank statement record). A goal is to find a sub-set of target entities $T_S \subseteq T$ having a maximal matching score to $\vec{q}$ (computed by a score function $f$) and satisfying the value sum constraint. This can be referred to as a search problem. In many use cases, such as the example use case referenced herein, there exists a numeric field $\alpha$ in the query table (e.g., the field 310 of FIG. 3) and a numeric field b in the target table (e.g., the field 312 of FIG. 3). The value sum constraint requires that $\vec{q} \cdot \alpha = \Sigma_{\vec{t} \in T_s} \vec{t} \cdot b$ or, more generically, $|\vec{q} \cdot \alpha - \Sigma_{\vec{t} \in T_s} \vec{t} \cdot b| \le \epsilon$ where $\epsilon \ge 0$. Here $\vec{q} \cdot \alpha$ and $\vec{t} \cdot b$ are real numbers and are not restricted to integers only. It can be assumed that $\vec{t} \cdot b \ne 0$ for all $\vec{t} \in T$. This can be achieved by, for example, filtering out all $\vec{t} \in T$ where $\vec{t} \cdot b = 0$ in advance (i.e., before matching entities).

For purposes of illustration, an exact value match is first considered (i.e., $\epsilon = 0$). Mathematically, a search problem can be formulated as solving:

$$\operatorname*{argmax}_{T_S \subseteq T \setminus \{\phi\}} f(\vec{q}, T_s)$$

$$\text{subject to: } \vec{q} \cdot a = \sum_{\vec{t} \in T_s} \vec{t} \cdot b$$

Here $f(\vec{q}, T_s)$ quantifies a match score, referred to as confidence herein, between $\vec{q}$ and all targets in $T_s$. The higher the confidence is the more likely that the match is correct. One way to define $f$ is to train a ML model on historical data.

For example, a ML model is provided as a classifier that is trained to predict whether a query entity ($\vec{q}$) and a set of one or more target entities $T_s$ form a match. In some examples, the ML model is a function $f$ that maps query entity ($\vec{q}$) and one or more target entities in $T_s$ into a vector of probabilities ($\vec{c}$) (also called 'confidences' in the deep learning context) for the labels in the set of class labels. This can be represented as:

$$f(\vec{q}, T_s) = \vec{c}$$

where $\vec{c} = \{c_0, c_1\}$. In some examples, $c_0$ is a prediction confidence of an entity pair belonging to a first class (e.g., no match), $c_1$ is a prediction confidence of the entity pair belonging to a second class (e.g., match).

Here, $c_0$, and $c_1$ can be provided as numerical values indicating a likelihood (confidence) that the combination of query entity and target entities ($\vec{q}, T_s$) belongs to a respective class. In some examples, the ML model can assign a label to the combination ($\vec{q}, T_s$) based on the values of $c_0$ and $c_1$. In some examples, the ML model can assign the label corresponding to the highest value of $c_0$ and $c_1$. For example, for an entity pair, the ML model can provide that $c_0=0.13$ and $c_1=0.87$. Consequently, the ML model can assign the class 'match' to the entity combination ($\vec{q}$, $T_s$).

For the search problem discussed above, one possible solution is to exhaustively enumerate all of the sub-sets of T and identify those sub-sets having a sum of values that corresponds to the value sum constraint. However, the number of possible sub-sets is exponential to the size of T (i.e., |T|). That is, for example, the number of possible sub-sets in T is equal to $2^N$, wherein N is the number of target entities in T. Such an approach, however, is only practical when |T| is small (e.g., |T|≤20). When |T| is large, enumerating all of the sub-sets of T becomes so computationally intensive that it is not practical given hardware constraints. That is, for example, such an approach is overly burdensome on processing power (CPU cycles) and memory. For example, when N=20, there are 1,048,576 possible sub-sets to be enumerated. In typical instances N≥1000. As an example, if N=1000, there are $1.07e^{301}$ sub-sets to enumerate.

In view of the above context, implementations of the present disclosure are directed to a resource-efficient search for matching query entities to one or more target entities under a constraint. More particularly, implementations of the present disclosure are directed to a resource-efficient search that identifies sub-sets of matching entities from a set of matching entities under a constraint using decomposed searching and memory. In the context of the present disclosure, the constraint is a value sum constraint, in which a value of a query entity should be equal to, or approximately equal to (i.e., within a tolerance of) a value sum of values of a sub-set of target entities to be matched to the query entity, each sub-set of target entities including one or more target entities.

As described in further detail herein, the resource-efficient search of the present disclosure is an alternative to traditional approaches, such as exhaustive search, and resource-efficiently explores the search space (i.e., potential sub-sets of entities), while avoiding the resource-expensive task of enumerating all sub-sets of T. In this manner, implementations of the present disclosure enable matching query entities to one or more target entities under value sum constraints to be scaled to larger sets of target entities (e.g., 20 or more target entities) under practical resource considerations.

In accordance with implementations of the present disclosure, $T=[\vec{t}_0, \ldots, \vec{t}_{N-1}]$ is provided as an array, in which elements have some order. One way to introduce order is to sort the elements according to respective values in field b. In some examples, the order can be arbitrary. In further detail, $S[i-1, x]$ can represent the set of all sub-sets of $[\vec{t}_0, \ldots, \vec{t}_{i-1}]$ where, for each $S \in S[i-1, x]$, it holds that $x = \sum_{\vec{t} \in S} \vec{t} \cdot b$. Implementations of the present disclosure compute $S[N-1, \vec{q} \cdot \alpha]$. When N=1, it is only to be determined whether $\vec{t}_0 \cdot b = \vec{q} \cdot \alpha$ which is a computationally simple task. When N≥2, however, the following example relationship is provided:

$$S[N-1, \vec{q} \cdot \alpha] = \{S \cup \{\vec{t}_{N-1}\} | S \in S[N-2, \vec{q} \cdot \alpha - \vec{t}_{N-1} \cdot b]\} \cup S[N-2, \vec{q} \cdot \alpha]$$

Here, $\{\vec{t}_{N-1}\}$ is a sub-set having target entity $\vec{t}_{N-1}$ as the only element. According to the example relationship above, to compute $S[N-1, \vec{q}, \alpha]$, it is needed to compute $S[N-2, \vec{q} \cdot \alpha - \vec{t}_{N-1} \cdot b]$ and $S[N-2, \vec{q} \cdot \alpha]$. The results of these computations can be combined to obtain the result of $S[N-1, \vec{q} \cdot \alpha]$.

Accordingly, implementations of the present disclosure decompose the search problem into two smaller-sized sub-problems. Each sub-problem can, in turn, be decomposed into two sub-problems. This decomposition continues until a sub-problem contains a single target entity only (a so-called atomic sub-problem) and can thus be solved directly. The result of each atomic sub-problem is memorized (e.g., stored in a cache) and is aggregated upward along the search path. This memorization obviates a need to solve repetitive sub-problems and enables early pruning of infeasible sub-sets, such that those sub-sets are not considered again. In this manner, computation time and consumption of resources are reduced.

In further detail, implementations of the present disclosure provide a data structure for memorization. It can be noted that each sub-problem can be characterized by (a) the maximum target index to consider and (b) the remaining numeric value. Because the remaining numeric value(s) can be real numbers, a two-dimensional array cannot be used as it otherwise would be in traditional dynamic programming approaches. Instead, implementations of the present disclosure use a hash table to memorize already solved sub-problems. In some examples, each key in the hash table has the form (max_index, query_value). In some examples, the hash value is computed based on combinations of both max_index and query_value (e.g.. they are treated as a composite key). For example, different pairs (tuples) of (max_index, query_value) map to different hash values. By way of non-limiting example, tuples (10, 100) and (10, 200) hash to different values though the max_index is identical (10) in both cases. In general, any standard hash function can be used which usually depends on a set of arithmetic and/or bit operations. The hashing function maps the tuples to a range of hash (or integer) values, such that hash collisions (different tuples mapping to same hash value) are minimized. A typical approach is that, for each tuple, an XOR operation is performed with a fixed constant, then multiplied with another fixed constant (called a hashing multiplier) and the resulting values are added to produce the hash value. By problem decomposition and memorization, implementations of the present disclosure provide technical improvements over traditional approaches, such as exhaustive enumeration of all sub-sets.

Listing 1, below, provides example pseudo-code for the resource-efficient search in accordance with implementations of the present disclosure:

function find_subsets:
  input:
    $T=[\vec{t}_0, \ldots, \vec{t}_{N-1}]$: array of targets
    $\vec{q}$: query
  output: best subset $T_s$ of $\vec{q}$
  1 set values[0, ..., N-1]=[$\vec{t}_0 \cdot b, \ldots, \vec{t}_{N-1} \cdot b$]
  2 set ids[0, ..., $N^N-1$]=[$\vec{t}_0 \cdot id, \ldots, \vec{t}_{N-1} \cdot id$]
  3 set query_value=$\vec{q} \cdot \alpha$
  4 set subsets=output of calling function find_subsets_with_memorization using the above parameters
  5 output $T_S$ in subsets with maximal mean matching score to $\vec{q}$ Listing 1: Example Pseudo-Code for
Resource-Efficient Search As seen in Listing 1, an intermediate search function (find_subsets_with_ memorization) is called. Example pseudo-code for the intermediate search function is provided in Listing 2, below:

```
function find subsets_with_memorization:
  input:
    values [0, ..., N-1] : target value array
    ids[0, ..., N-1]: target id array
    query_value: numeric value of query
  output: subsets of (max_index, query_value)
1.   set max_index = N - 1
2.   intialize lowers[0, ..., N-1] where
```

$$lowers[i] = \sum_{j=0 \wedge values[j]<0}^{i} values[j]$$

```
     // 0 if no negative value
3.   intialize uppers[0, ..., N-1] where
```

$$uppers[i] = \sum_{j=0 \wedge values[j]<0}^{i} values[j]$$

```
     // 0 if no positive value
4.   set memory to empty hash table
5.   create empty stack
6.   push problem (max_index, query_value) to stack
7.   while stack is not empty:
8.     set P = pop the first sub-problem (running_max_index,
       running_query_value) from stack
9.     if P is in memory: // P is already solved
10.        continue
11.    else if running_query_value ∉
       [lowers[running_max_index], uppers[running_max_index]]:
12.        P has no subsets, add this information to memory
13.    else if running_max_index = 0:
14.        if values[running_max_index] =
       running_query_value:
15.            subset {ids[running_max_index]} is a solution
       of P, add this information to memory
16.        else:
17.            P has no subsets, add this information to
       memory
18.    else:
19.        set P_L = sub-problem (running_max_index – 1,
       running_query_value – values[running_max_index])
20.        set P_R = sub-problem (running_max_index – 1,
       running_query_value)
21.        if Pl is not in memory or P_R is not in memory:
22.            push P back to stack
23.
24.            if P_L is not in memory:
25.                push P_L to stack
26.
27.            if P_R is not in memory:
28.                push P_R to stack
29.        else:
30.            initialize subsets as an empty array
31.
32.            get solutions of P_L from memory
33.            add ids[running_max_index] to each of such
       solutions, then add all of them to subsets
34.
35.            get solutions of P_R from memory and add them
       to subsets
36.
37.            if values[running_max_index] =
       running_query_value:
38.                add subset {ids[running_max_index]} as a
       solution to subsets
39.
40.            set subsets as solutions of P, add this
       information to memory
41.
42.    get solutions of problem (max_index, query_value) from
       memory and output them
```

Listing 2: Example Pseudo-Code for Intermediate Search Function

In some implementations, the intermediate search function can be executed using either a stack or recursion. Use of a stack is described in further detail herein as a non-limiting example of implementations of the present disclosure. In further detail, each sub-problem is provided as a tuple (running_max_index, running_query_value). At each iteration, P is popped from stack (line 8). If P is in memory (line 9) (i.e., already solved), P need not be solved again, thereby saving time and computing resources.

If P is not in memory (i.e., not solved yet), multiple scenarios are considered. In a first scenario, if running_query_value is out of a limit range of [lower[running_max_index], upper[running_max_index]], it is determined that P has no solution and the search terminates (lines 11 and 12). In a second scenario, if there is only one target entity left to consider (line 13), and if the value of the item is equal to the running query value, the singleton sub-set containing the target entity is a solution of P, which is recorded memory (lines 14 & 15). Otherwise, P has no solution and the search can terminate (line 17). In a third scenario, sub-problem $P_L$ and sub-problem $P_R$ are considered. In some examples, sub-problem $P_L$ is approximately equivalent to P when the target entity at index max_index is considered, and sub-problem $P_R$ is approximately equivalent to P when the target entity at index max_index is ignored. If any sub-problem is not solved yet, it is solved and the results are re-used to solve P. This process is depicted in lines 19 to 40 of Listing 2. In this manner, computing time is reduced and computing resources are conserved. When the stack is empty, the search terminates and the solutions of the problem represented by (max_index, query_value) are returned.

Implementations of the present disclosure can also account for a tolerance ($\epsilon$) value match (i.e., when a value sum is approximately equal). More particularly, and as described in further detail herein, the intermediate search function of the present disclosure can be modified to accommodate the sum value constraint of the form $|\vec{q}\cdot\alpha - \Sigma_{\vec{t}\in T_s}\vec{t}\cdot b| \leq \epsilon$ where $\epsilon \geq 0$. For example, the intermediate search function can be called as (find_subsets_with_memorization_and_tolerance) (e.g., in line 4 of Listing 1).

More specifically, consider a sub-set of targets $T_s \subseteq T$ that satisfies the sum value constraint. Setting $T'_s \subset T_s$, it holds that $|(\vec{q}\cdot\alpha - \Sigma_{\vec{t}\in T_s \setminus T'_s}\vec{t}\cdot b) - \Sigma_{\vec{t}\in T'_s}\vec{t}\cdot b| \leq \epsilon$, which can be interpreted as $|remaining\_amount - \Sigma_{\vec{t}\in T'_s}\vec{t}\cdot b| \leq \epsilon$. This implies that, by enforcing the $\epsilon$-tolerance at each step of the search path, qualified sub-sets can be recovered. This extension is depicted in Listing 3, below, which provides modifications to selected lines of Listing 2 to indicate changes:

```
function find_subsets_with_memorization_and_tolerance:
...
9.     if P is in memory. // P is already solved
10.        continue
11.    else if running_query_value ∉
[lowers [running_max_index] – ε, uppers[running_max_ index] + ε] :
...
13.    else if running_max_index = 0:
14.        if |values[running_max_index] –
running_query_value| ≤ ε:
15.            subset {ids[max_index]} is a potential
solution of P, add this information to memory
...
32.            get solutions of P_L from memory
33.            for each subset T_s in those solutions:
34.                if |values[running_max_index] + value sum
of T_s – running_query_ value| ≤ ε:
35.                    add ids[running_max_index] to T_s, then
add T_s to subsets
36.
37.            get solutions of P_R from memory and add them
to subsets
```

-continued

```
38.
39.            if |values[running_max_index] –
running_query_value| ≤ ε:
40.                add subset {ids[max_index]} as a
potential solution to subsets
41.
42.            set subsets as solutions of P, add this
information to memory
43.
44.   get solutions of problem (max_index, query_value) from
memory and output them
```

Figure 4:
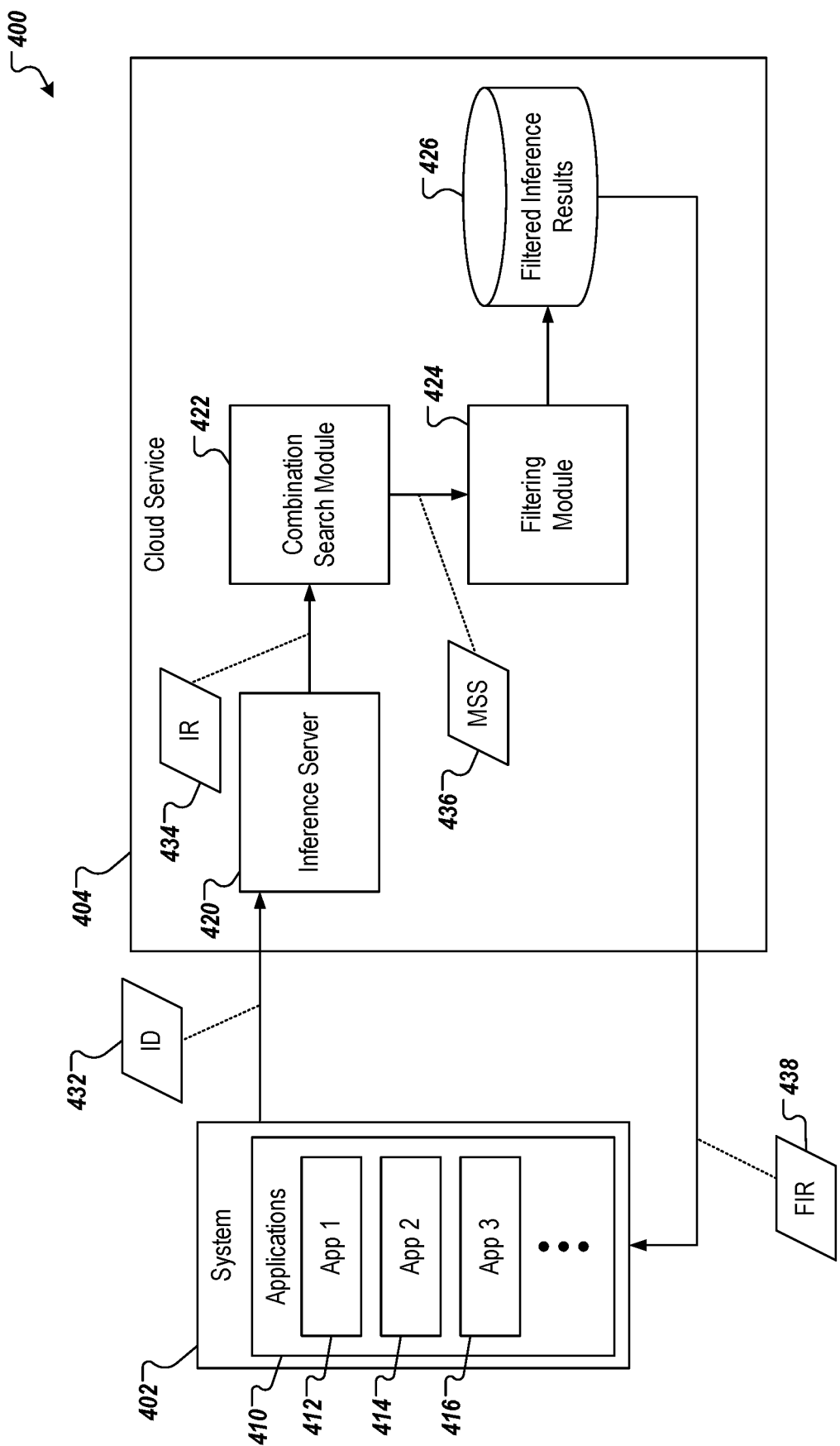
FIG. 4 depicts an example conceptual architecture for inference in accordance with implementations of the present disclosure.

Listing 3: Example Portion of Pseudo-Code for Intermediate Search Function with Tolerance FIG. 4 depicts an example conceptual architecture 400 for inference in accordance with implementations of the present disclosure. In the example of FIG. 4, the conceptual architecture 400 includes an enterprise system 402 (e.g., SAP S/4 HANA (either cloud or on premise)) and a cloud service 404. The enterprise system 402 executes a set of applications 410 including applications 412, 414, 416. In some examples, one or more of the applications 412, 414, 416 submit inference jobs to the cloud service 404 to receive inference results therefrom.

In the example of FIG. 4, the cloud service 404 is executed within a cloud platform to perform inference services. In the example of FIG. 4, the cloud service 404 includes an inference server 420, combination search module 422, a filtering module 424, and a filtered inference results (FIR) store 426. The inference server 420 executes a (trained) ML model to provide predictions, also referred to herein as inference results (IR).

During inference, the inference server 420 receives inference data 432 that is to be processed by the inference server 420 using the ML model to provide IR 434. For example, and in the example context discussed herein, the inference data 432 includes a bank statement document (e.g., bank statement table) and an invoice document (e.g., invoice table) and the IR 434 includes predictions of matches between invoices and bank statement records. Each inference result in the IR 434 is associated with a respective confidence. The combination search module 422 executes the resource-efficient search (e.g., of Listing 1), which calls the intermediate search function (e.g., of Listing 2) or the intermediate search function with tolerance (e.g., of Listing 2 as modified by Listing 3) to provide matched sub-sets (MSS) 436. The filtering module 424 receives the MSS 436 and selectively filters inference results from the MSS 436 to provide FIR 438, which is stored in the FIR store 426.

By way of non-limiting example, example inference data, inference results, matching sub-sets, and filtered inference results can be considered. The following example inference data can be provided:

Table 1: Example Query Records (left) and
Table 2: Example Target Records (right)

| Query | | Target | |
|---|---|---|---|
| Q | Value | T | Value |
| 6 | 100 | 15 | 70 |
| 7 | 1100 | 11 | 20 |
| ... | ... | 2 | 30 |
| | | 3 | 10 |

Table 1: Example Query Records (left) and
Table 2: Example Target Records (right)

| Query | | Target | |
|---|---|---|---|
| Q | Value | T | Value |
| | | 16 | 50 |
| | | 18 | 1100 |
| | | ... | ... |

The query records of Table 1 and the Target records of Table 2 can be provided as input to the ML model, which processes both to determine inference results that includes matches between each query record and one or more target records. For each predicted match, a confidence is provided. Example inference results can include:

TABLE 3

Example Inference Results

| Q | T | Confidence |
|---|---|---|
| 6 | 2 | 0.93 |
| 6 | 3 | 0.91 |
| 6 | 11 | 0.5 |
| 6 | 15 | 0.99 |
| 6 | 16 | 0.37 |
| 7 | 18 | 0.9 |
| ... | ... | ... |

The resource-efficient search, which calls the intermediate search function or the intermediate search function with tolerance, processes the inference results to provide matched sub-sets. Continuing with the example of Table 3, above, example matched sub-sets can include:

TABLE 4

Example Matched Sub-sets

| Q | T Sub-Set | T Set Sum | Avg. Confidence |
|---|---|---|---|
| 6 | (3, 11, 15) | 100 | 0.8 |
| 6 | (2, 11, 16) | 100 | 0.6 |
| 6 | (2, 15) | 100 | 0.96 |
| 7 | (18) | 1100 | 0.9 |
| ... | ... | ... | ... |

In the example of Table 4, a first sub-set with target identifiers (3, 11, 15), a second sub-set with target identifiers (2, 11, 16), and a third sub-set with target identifiers (2, 15) are each determined to include matching target entities with the query entity having the query identifier 6. Also, a fourth sub-set with target identifier (18) is determined to match the query entity having the query identifier 7. With respect to query identifier 6, it is evident that the sum of the values of the target items respectively match the target value of 100 of the query item 6. With respect to query identifier 7, it is evident that the value of the target item matches the target value of 1100.

In addition to the matching sets, the average confidence values of the set are provided (e.g., as depicted in Table 4) and are calculated based on the confidence values returned by the ML model (e.g., as depicted in Table 3).

In some implementations, matching sets are filtered to provide filtered inference results. In some examples, the average confidence value of each matching sub-set is compared to a threshold confidence. If the average confidence value is less than the threshold confidence, the matching set is filtered (e.g., removed from the matching sets). Continuing with the examples of Table 4 and a threshold confidence of 0.9, example filtered inference results can be provided as:

TABLE 5

Example Filtered Results

| Q | T Set | T Set Sum | Avg. Confidence |
|---|---|---|---|
| 6 | (2, 15) | 100 | 0.96 |
| 7 | (18) | 1100 | 0.9 |
| ... | ... | ... | ... |

The FIR 438 is provided as output to the system 402 for execution of one or more tasks based thereon. For example, inference results that meet or exceed a confidence threshold for proposals, but do not meet a confidence threshold for one or more automated tasks, are provided as proposals (e.g., to a user for the user to determine whether to execute one or more tasks). As another example, inference results that meet or exceed the confidence threshold for the one or more automated tasks, result in the one or more automated tasks being automatically performed (e.g., clearing of invoices that are the subjects of the inference results).

Figure 5:
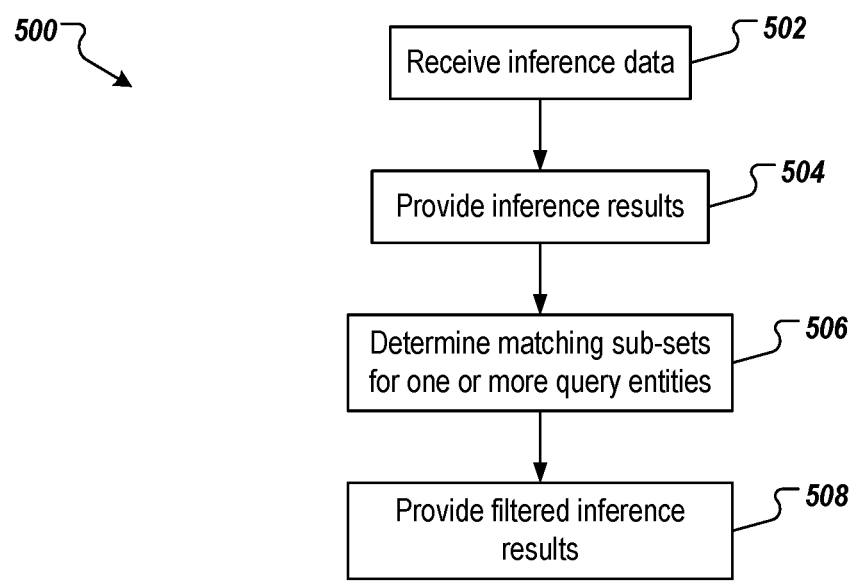
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Inference data is received (502) and inference results are provided (504). For example, and as described herein with reference to FIG. 4, the inference server 420 receives inference data 432 that is to be processed by the inference server 420 using the ML model to provide the IR 434. For example, and in the example context discussed herein, the inference data 432 includes a bank statement document (e.g., bank statement table) and an invoice document (e.g., invoice table) and the IR 434 includes predictions of matches (e.g., multi-matches, single matches) between each bank statement record (query entity) and one or more invoice records (target entities). Each inference result in the IR 434 is associated with a respective confidence.

Matched sub-sets are determined (506). For example, and as described herein, the combination search module 422 receives the IR 434 and executes the resource-efficient search (e.g., of Listing 1), which calls the intermediate search function (e.g., of Listing 2) or the intermediate search function with tolerance (e.g., of Listing 2 as modified by Listing 3) to provide the MSS 436. As described herein, each matched sub-set in the MSS 436 includes, for each query entity, one or more matched sub-set that meets a value sum constraint with respect to a value associated with the query entity. That is, the sum of values associated with target entities in a sub-set of target entities corresponds to (e.g., is equal to or is within a tolerance of) the value associated with the query entity. In some examples, each matched sub-set includes one or more target entities.

Filtered inference results are provided (508). For example, and as described herein, the filtering module 424 receives the MSS 436 and selectively filters inference results from the MSS 436 to provide FIR 438, which is stored in the FIR store 426. In some examples, an average confidence value of each matched sub-set in the MSS 436 is compared to a threshold confidence. If the average confidence value is less than the threshold confidence, the matching set is filtered (e.g., removed from the MSS 436). In some examples, one or more tasks are executed based on the FIR 438 (e.g., any unfiltered matching sub-sets in the FIR 438). For example, and as described herein, one or more tasks can be automatically executed in response to one or more inference results (encapsulated in matching sub-sets). For example, matched invoices are either automatically cleared (auto-clearing) or suggested for review by a user (e.g., accounts receivable).

Figure 6:
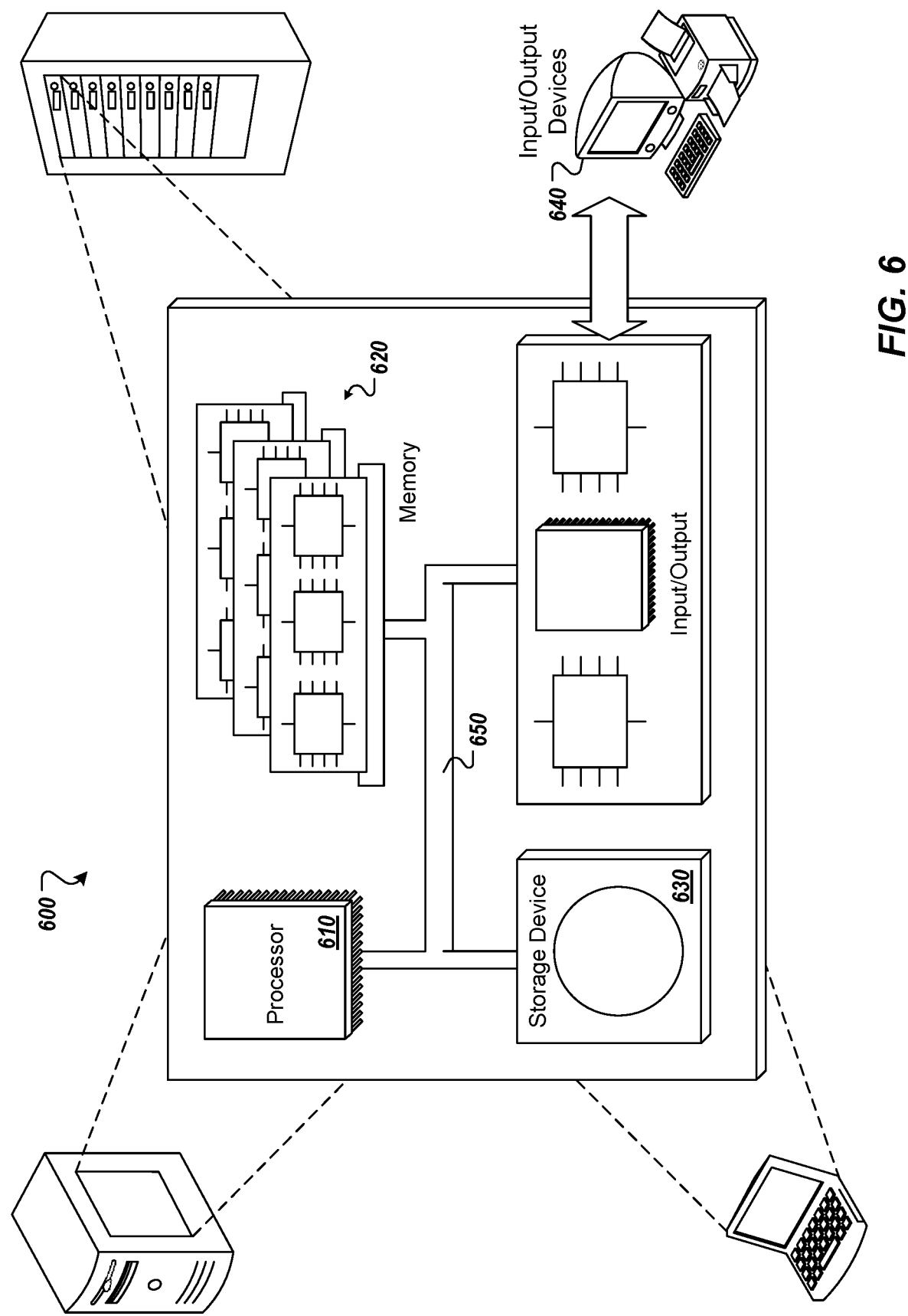
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for executing tasks in response to matching entities using a machine learning (ML) model, the method being executed by one or more processors and comprising:
  receiving a set of inference results generated by a ML model, the inference results comprising a set of query entities and a set of target entities, each query entity having one or more target entities matched thereto by the ML model;
  processing the set of inference results to generate a set of matched sub-sets of target entities by executing a search over target entities in the set of target entities based on constraints, for each problem in a set of problems, providing the problem as a tuple comprising an index value representative of a target entity in the set of target entities and a value associated with the query entity, the value comprising a constraint relative to the query entity, and executing one of:
    determining, at least partially based on the index value, that a solution to the problem is stored in memory, and in response, processing a next problem,
    determining that the value is outside of a limit range associated with the index value, and in response, determining that the problem has no matched sub-sets,
    determining that the target entity represented by the index value is a last target entity to be considered and, in response, executing one of including a value of the target entity into a singleton matched sub-set in response to determining that the value of the target entity corresponds to the value associated with the query entity, and determining that the problem has no matched sub-sets, and
    determining that the target entity represented by the index value is a last target entity to be considered and, in response, dividing the problem into sub-problems and selectively storing solutions to the sub-problems in the memory; and
  executing at least one task in response to one or more matched sub-sets in the set of matched sub-sets.

2. The method of claim 1, further comprising filtering at least one matched sub-set from the set of matched sub-sets to provide filtered inference results in response to a confidence value of the at least one matched sub-set being less than a threshold confidence value, the one or more matched sub-sets being included in the filtered inference results.

3. The method of claim 2, wherein the confidence value of the at least one matched sub-set is provided as an average of confidence values of one or more target entities included in the at least one matched sub-set.

4. The method of claim 1, wherein the memory comprises a hash table.

5. The method of claim 1, wherein one or more solutions are at least partially based on a tolerance value.

6. The method of claim 1, wherein each problem is provided in a stack and search over target entities terminates in response to determining that the stack is empty.

7. The method of claim 1, further comprising selectively filtering at least one target entity from the set of target entities before generating the inference results by the ML model in response to the at least one target entity being associated with a zero value in the target value field.

8. A non-transitory computer-readable storage medium coupled to one or more processors and having instructions stored thereon which, when executed by the one or more processors, cause the one or more processors to perform operations for executing tasks in response to matching entities using a machine learning (ML) model, the operations comprising:
  receiving a set of inference results generated by a ML model, the inference results comprising a set of query entities and a set of target entities, each query entity having one or more target entities matched thereto by the ML model;
  processing the set of inference results to generate a set of matched sub-sets of target entities by executing a search over target entities in the set of target entities based on constraints, for each problem in a set of problems, providing the problem as a tuple comprising an index value representative of a target entity in the set of target entities and a value associated with the query entity, the value comprising a constraint relative to the query entity, and executing one of:
  determining, at least partially based on the index value, that a solution to the problem is stored in memory, and in response, processing a next problem,
  determining that the value is outside of a limit range associated with the index value, and in response, determining that the problem has no matched sub-sets,
  determining that the target entity represented by the index value is a last target entity to be considered and, in response, executing one of including a value of the target entity into a singleton matched sub-set in response to determining that the value of the target entity corresponds to the value associated with the query entity, and determining that the problem has no matched sub-sets, and
  determining that the target entity represented by the index value is a last target entity to be considered and, in response, dividing the problem into sub-problems and selectively storing solutions to the sub-problems in the memory; and
executing at least one task in response to one or more matched sub-sets in the set of matched sub-sets.

9. The non-transitory computer-readable storage medium of claim 8, wherein operations further comprise filtering at least one matched sub-set from the set of matched sub-sets to provide filtered inference results in response to a confidence value of the at least one matched sub-set being less than a threshold confidence value, the one or more matched sub-sets being included in the filtered inference results.

10. The non-transitory computer-readable storage medium of claim 9, wherein the confidence value of the at least one matched sub-set is provided as an average of confidence values of one or more target entities included in the at least one matched sub-set.

11. The non-transitory computer-readable storage medium of claim 8, wherein the memory comprises a hash table.

12. The non-transitory computer-readable storage medium of claim 8, wherein one or more solutions are at least partially based on a tolerance value.

13. The non-transitory computer-readable storage medium of claim 8, wherein each problem is provided in a stack and search over target entities terminates in response to determining that the stack is empty.

14. The non-transitory computer-readable storage medium of claim 8, wherein operations further comprise selectively filtering at least one target entity from the set of target entities before generating the inference results by the ML model in response to the at least one target entity being associated with a zero value in the target value field.

15. A system, comprising:
a computing device; and
a computer-readable storage device coupled to the computing device and having instructions stored thereon which, when executed by the computing device, cause the computing device to perform operations for executing tasks in response to matching entities using a machine learning (ML) model, the operations comprising:
  receiving a set of inference results generated by a ML model, the inference results comprising a set of query entities and a set of target entities, each query entity having one or more target entities matched thereto by the ML model;
  processing the set of inference results to generate a set of matched sub-sets of target entities by executing a search over target entities in the set of target entities based on constraints, for each problem in a set of problems, providing the problem as a tuple comprising an index value representative of a target entity in the set of target entities and a value associated with the query entity, the value comprising a constraint relative to the query entity, and executing one of:
    determining, at least partially based on the index value, that a solution to the problem is stored in memory, and in response, processing a next problem,
    determining that the value is outside of a limit range associated with the index value, and in response, determining that the problem has no matched sub-sets,
    determining that the target entity represented by the index value is a last target entity to be considered and, in response, executing one of including a value of the target entity into a singleton matched sub-set in response to determining that the value of the target entity corresponds to the value associated with the query entity, and determining that the problem has no matched sub-sets, and
    determining that the target entity represented by the index value is a last target entity to be considered and, in response, dividing the problem into sub-problems and selectively storing solutions to the sub-problems in the memory; and
  executing at least one task in response to one or more matched sub-sets in the set of matched sub-sets.

16. The system of claim 15, wherein operations further comprise filtering at least one matched sub-set from the set of matched sub-sets to provide filtered inference results in response to a confidence value of the at least one matched sub-set being less than a threshold confidence value, the one or more matched sub-sets being included in the filtered inference results.

17. The system of claim 16, wherein the confidence value of the at least one matched sub-set is provided as an average of confidence values of one or more target entities included in the at least one matched sub-set.

18. The system of claim 15, wherein the memory comprises a hash table.

19. The system of claim 15, wherein one or more solutions are at least partially based on a tolerance value.

20. The system of claim 15, wherein each problem is provided in a stack and search over target entities terminates in response to determining that the stack is empty.

* * * * *